United States Patent [19]

Kistner

[11] 4,121,358
[45] Oct. 24, 1978

[54] WALL COVERING, CARPET AND DRAPERY DISPLAYING ROOM SIMULATOR

[75] Inventor: John E. Kistner, Austin, Tex.
[73] Assignee: Kistner Co., Inc., Austin, Tex.
[21] Appl. No.: 844,506
[22] Filed: Oct. 21, 1977
[51] Int. Cl.² ............................................. G09B 25/00
[52] U.S. Cl. ....................................................... 35/53
[58] Field of Search ........................... 35/16, 49, 53, 55

[56] References Cited

U.S. PATENT DOCUMENTS

| | | | |
|---|---|---|---|
| 2,301,274 | 11/1942 | Greiser | 35/53 |
| 2,317,337 | 4/1943 | Adams | 35/55 |
| 3,188,760 | 6/1965 | Miller | 35/53 X |
| 3,961,426 | 6/1976 | Wallace | 35/16 |

Primary Examiner—Harland S. Skogquist
Attorney, Agent, or Firm—Clarence A. O'Brien; Harvey B. Jacobson

[57] ABSTRACT

Apparatus for simulating a room decor, the invention provides a display of any desired combination of floor, wall, and window coverings in order that the decorative effect of particular combinations thereof can be ascertained. The invention further provides selectively operable lighting for simulating daylight and artificial lighting conditions, the selectively operable lighting being carried on structural elements which are movable in tracks into functional relation to floor and wall coverings displayed by the apparatus.

10 Claims, 6 Drawing Figures

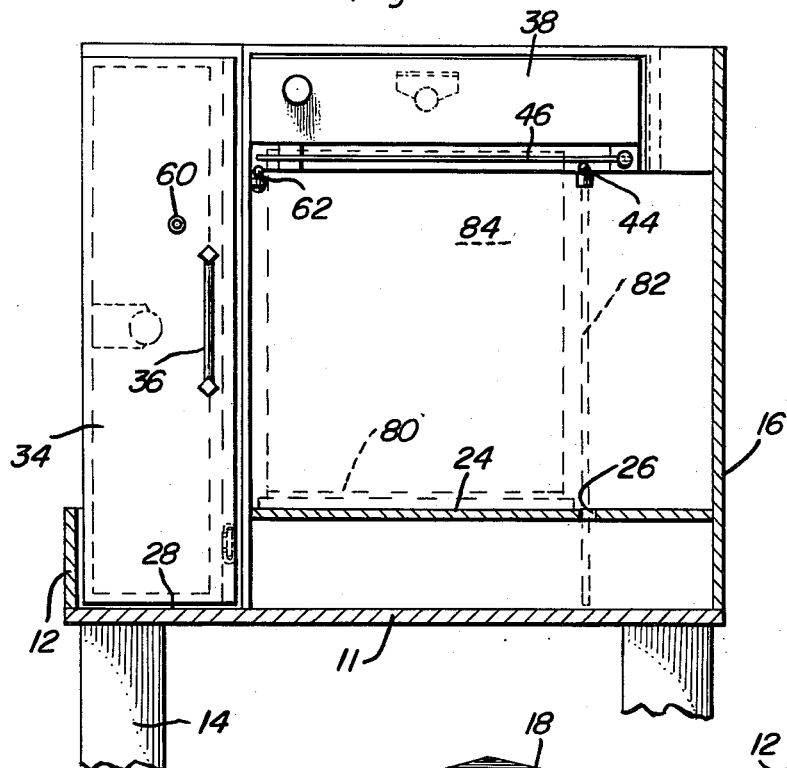
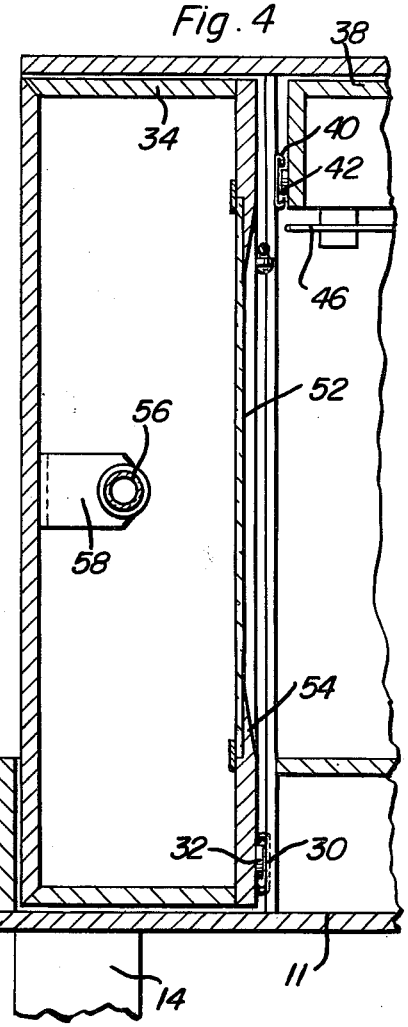
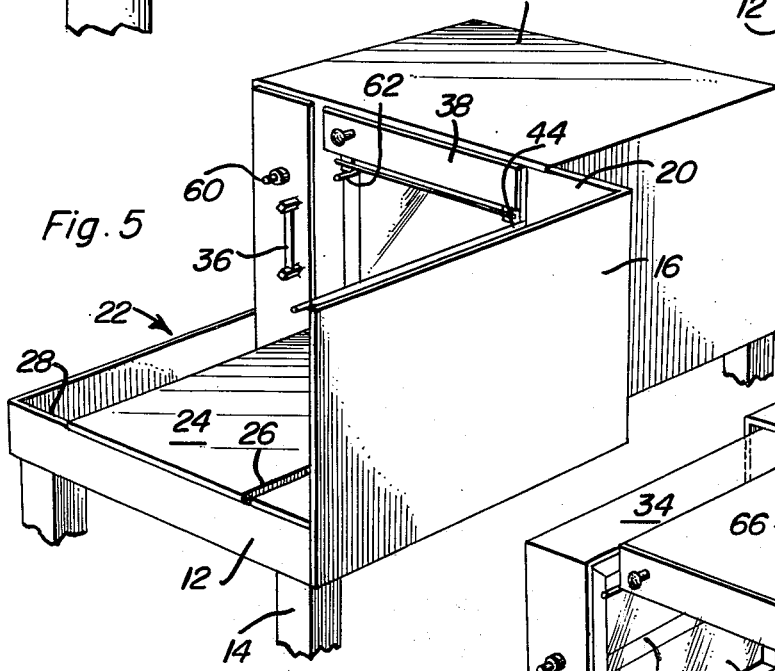
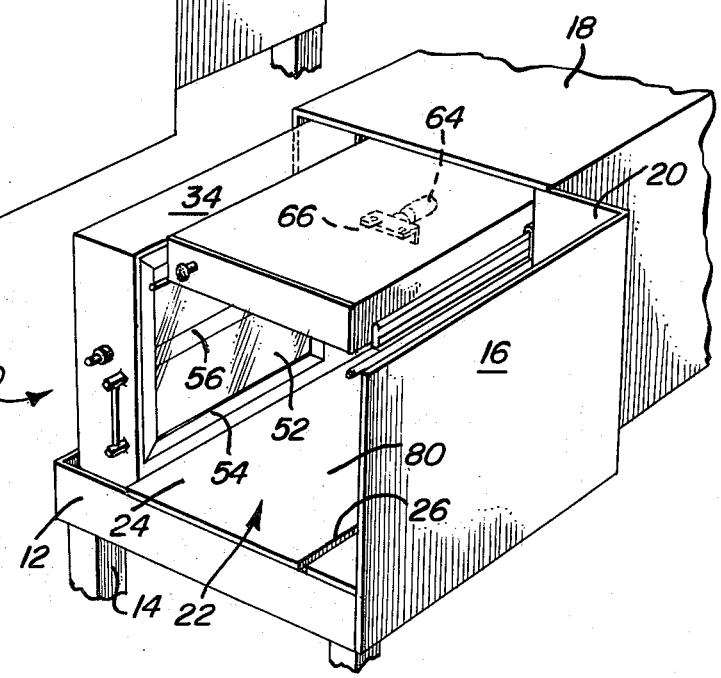

WALL COVERING, CARPET AND DRAPERY DISPLAYING ROOM SIMULATOR

BACKGROUND AND SUMMARY OF THE INVENTION

Interior decorating simulators previously disclosed in the art include those structures described in the following U.S. Pat. Nos. 1,247,160, 1,853,615, 2,194,238, 2,522,149, 3,590,500.

While the foregoing patents disclose various interior decorating simulators, it can be seen that the teachings of the prior art do not provide an apparatus capable of displaying wall, floor, and window coverings under lighting conditions simulating daylight and artificial lighting, the various coverings being readily interchanged and substituted for in order that a virtually infinite number of mixed and matched decorating schemes can be displayed in a relatively small space and within a relatively short period of time.

The present invention particularly provides room decor simulating apparatus capable of displaying standard carpet sample pieces and pre-cut wall coverings in a reduced space simulating the environmental and lighting conditions of a room. The simulated wall coverings include wallpaper samples of differing design and textures, simulated wall surfaces of differing solid colors and differing textures, or other simulated wall surfaces. According to the present invention, the "floor" of the simulation area has a carpet sample disposed thereon, the carpet sample preferably being of a standard sample size. Two "wall" surfaces adapted to be effectively disposed at right angles to the carpetbearing "floor" are disposed at right angles to each other and are adapted by means of horizontal rods spaced from the "floor" and extending along adjacent edge portions thereof to support the sample wall coverings relative to the carpet sample or other floor covering to provide a simulation of the decorative effect thereby provided. A simulated window mounted in a frame which can be moved from a storage position into juxtaposed relation to the floor covering and wall covering samples has a light source mounted relative thereto to provide a simulation of natural day lighting conditions, the light source being adapted to illuminate the room simulation area through the simulated window. Window covering samples can be draped over the window or supported by a horizontal rod spaced from and extending parallel to both the plane of the window and the plane of the "floor" to allow display of window covering samples so that the colors and textures of said samples can be coordinated with the decorative effect produced by the floor covering and wall covering samples. The invention further provides a simulated ceiling structure which can be moved into functional relation to the "floor" and adjacent side walls of a simulated room defined by the aforesaid wall coverings, the ceiling structure having an incandescent light source mounted thereon for simulating artificial lighting conditions within the room simulation area. The simulated ceiling and window structures are mounted on tracks which allow such structures to be moved to and from stored and functional locations as desired.

Accordingly, it is an object of the present invention to provide a room decor simulator apparatus for displaying any desired combination of floor, wall, and window coverings in order that the decorative effect of particular combinations thereof can be ascertained.

It is another object of the present invention to provide room decor simulation apparatus having selectively operable lighting for simulating daylight and artificial lighting conditions, the selectively operable lighting being carried on structural elements which are movable in tracks into functional relation to floor and wall coverings displayed in a room simulation area of the apparatus.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a section taken along line 3—3 of FIG. 1;

FIG. 4 is a sectional view taken substantially along line 4—4 of FIG. 1;

FIG. 5 is a perspective view of the present apparatus, the ceiling and window simulation portions of the present structure being shown in a stored configuration; and FIG. 6 is a perspective view of the present room simulation apparatus, the ceiling and window simulation structural portions of the apparatus being shown in a fully deployed and functional configuration.

DESCRIPTION OF THE PREFERRED EMBODIMENTS

Figure 1:
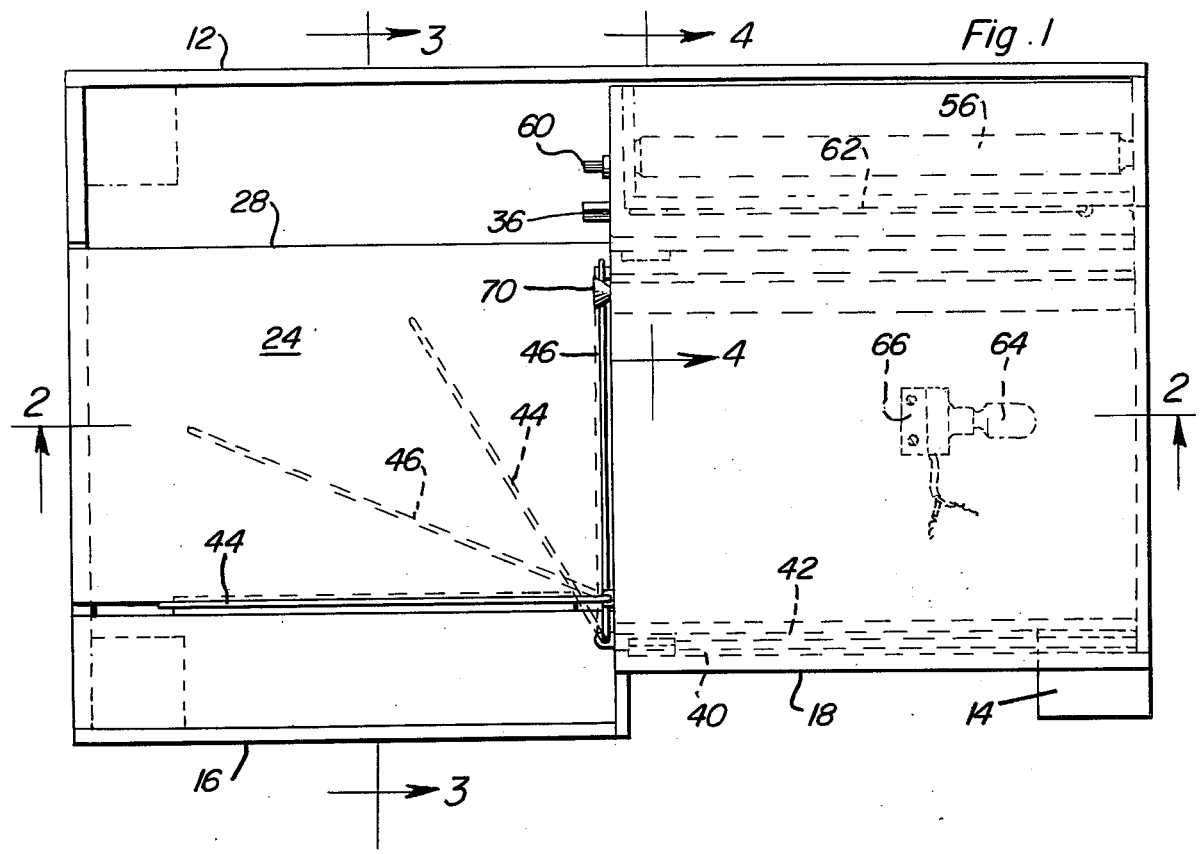
FIG. 1 is top view of the room simulation apparatus of the present invention, window and ceiling simulation structural portions of the invention being shown in the stored configuration.

Referring now to the drawings, a room decor simulator according to the present invention is seen at 10 to comprise a base plate 11 bordered by a base frame 12, the base plate 11 having legs 14 attached thereto at the corners of said plate. One side of the base frame 12 has a vertically extended side wall 16 which acts to partially enclose, in concert with base portions of a storage housing 18 and connecting wall 20 extending between said walls 16 and said housing 18, a simulation area 22. Display samples of floor, wall, and optionally window and ceiling coverings are mounted within the simulation area 22 as will be described hereinafter to produce a simulated room decor, the decorative effects of particular combinations of the coverings being ascertained under simulated daylight and artificial lighting conditions.

Figure 2:
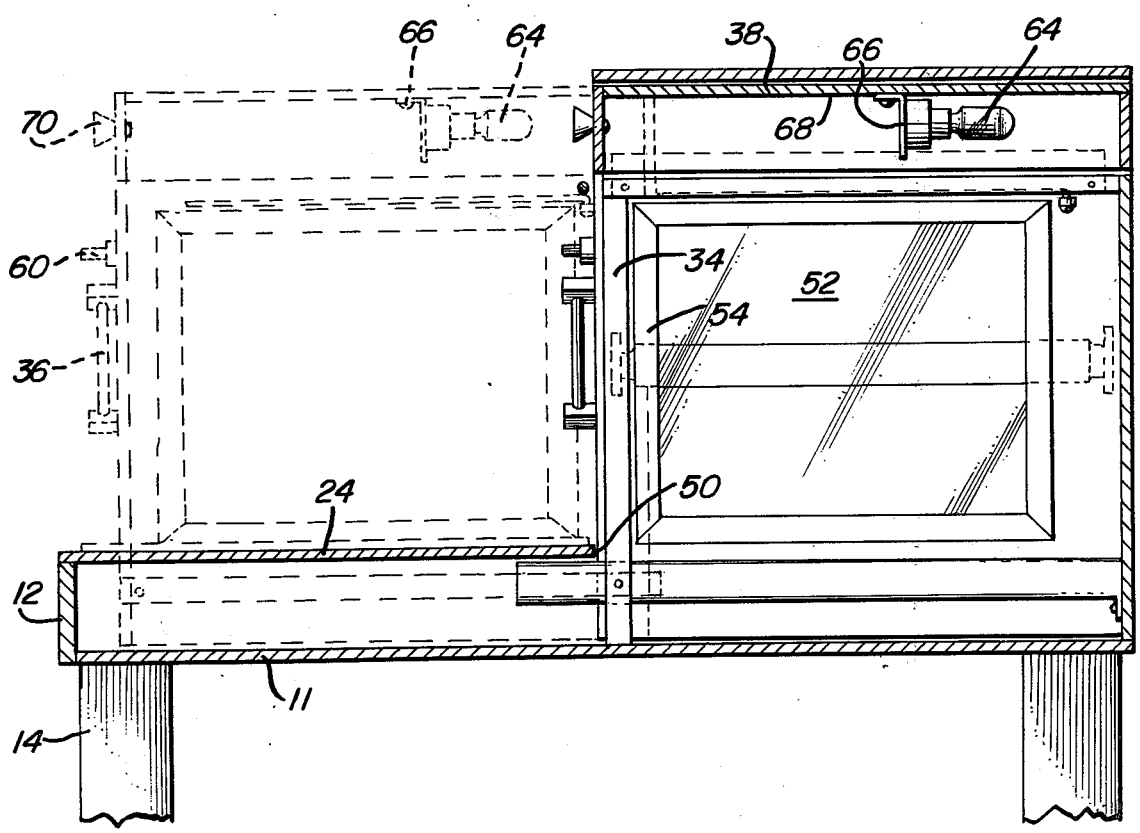
FIG. 2 is a section in elevation taken along line 2—2 of FIG. 1.

A display floor base 24 is seen to be mounted to the base frame 12 at upper perimetric portions thereof, the display floor base 24 not extending completely to that wall of the frame 12 opposite the side wall 16, thereby to define a track recess 28 along one side of the display floor base 24. The track recess 28 has a fixed track rail 30 mounted therein, the track rail 30 extending into the interior of the storage housing 18. A window simulation housing 34 has a track follower 32 disposed along an exterior lateral portion thereof, the track follower 32 mating with the fixed track rail 30 and being slidable therewithin to allow the window simulation housing 34 to be moved within the track recess 28. As is seen particularly in FIGS. 1, 2, and 5, the window simulation housing can be stored within the storage housing 18 when not in use by sliding said window simulation housing 34 into the confines of the storage housing 18 through the use of the track rail 30 and track follower 32 as aforesaid. The window simulation housing 34 preferably has a handle 36 mounted to the outer face thereof in order to facilitate manual displacement of said window simulation housing 34 within the track recess 28 in order that the window simulation housing 34 can be pulled into functional relation to the simulation area 22 or stored within the storage housing 18, as desired.

The storage housing 18 also mounts a ceiling simulation housing 38 for movement into positions external to and internal of said housing 18 corresponding to functional and stored configurations of the ceiling simulation housing 38. The ceiling simulation housing 38 has track followers 42 disposed on opposite vertical sides thereof, the track followers 42 mating with and being slidable within spaced track rails 40, the track rails 40 being mounted within the interior of the storage housing 18. As can be appreciated from the drawings, the window simulation housing 34 and the ceiling simulation housing 38 effectively comprise "drawer" structures which are mounted for sliding movement in the same manner as a suspension drawer is mounted in a file cabinet or desk. The window simulation housing 34 differs only from such prior structures by the fact that the housing 34 is vertically oriented.

A horizontal rod 44 is disposed within the simulation area 22 and spaced from the display floor base 24, the horizontal rod 44 being essentially parallel to said display floor base 24 and also to the plane of the side wall 16. A horizontal rod 46 is also disposed within the simulation area 22 at substantially a right angle to the horizontal rod 44, the horizontal rod 46 being disposed slightly in front of and below the ceiling simulation housing 38. The horizontal rods 44 and 46 can be mounted to a vertical pole 48 or can be otherwise mounted to structure attached to the storage housing 18 or connecting wall 20. The rods 44 and 46 are preferably mounted for rotation such that said rods can be disposed at differing angles relative to each other and can be removed from proximity to the simulation area 22 as desired.

A slit 26 is seen to be formed in the display floor base 24 immediately beneath the horizontal rod 44, the slit 26 being essentialy parallel to the rod 44. Similarly, a slit 50 is formed in the display floor base 24 immediately beneath the horizontal rod 46, the slit 50 being essentially parallel to the rod 46. The function of the rods 44 and 46 and of the slits 26 and 50 will be described in detail hereinafter.

The window simulation housing 34 has a frame 54 mounted therewithin, the frame 54 mounting a window 52, which window 52 is preferably formed of a material such as a clear plastic. When the window simulation housing 34 is fully withdrawn from the storage housing 18 into a functional relationship to the simulation area 22, the plane of the window 52 is disposed perpendicularly to the display floor base 24 and is substantially parallel to the side walls 16. A window structure is, therefore, simulated in the simulation area 22. A fluorescent light 56 is mounted within the window simulation housing 34 by mounting brackets 58, the light 56 being connected to a source of electrical power controllable by a switch 60 conveniently mounted on the exterior face portion of said housing 34. The fluorescent light 56 illuminates the simulation area through the window 52 to provide a simulation of natural daytime lighting conditions within the simulation area 22. A horizontal rod 62 is further mounted by the window simulation housing 34 on the side of the window 52 opposite the fluorescent light 56. The horizontal rod 62 is, therefore, movable with the window simulation housing 34, said rod 62 being substantially perpendicular to the horizontal rod 46 on movement of the housing 34 into a functional relationship with the simulation area 22.

The ceiling simulation housing 38 is seen to substantially comprise a drawer-like structure which can be slid from a stored configuration within the storage housing 18 into surmounting relation to the simulation area 22. A ceiling surface 68 of the housing 38 is seen to have an incandescent light 64 mounted within a fixture 66, the fixture 66 being attached to said ceiling surface 68. Accordingly, when the ceiling simulation housing 38 is withdrawn from the storage housing 18 and into spaced surmounting relation to the display floor base 24, operation of the incandescent light 64 provides artificial lighting within the simulation area 22 which simulates the artificial lighting within a room. Samples of decorative floor coverings and wall coverings, and even coverings for the window 52, can, therefore, be illuminated in a fashion simulating both daylight and artificial night lighting conditions. The ceiling simulation housing 38 is further provided with a knob 70 which can be used to withdraw the housing 38 along the track rails 40 to a position surmounting the simulation area 22 as aforesaid. A switch (not shown) can be conveniently mounted to the housing 38 for operation of the light 64 in a known manner.

When utilizing the room decor simulator 10 for simulation of the effect provided by differing combinations of floor coverings, wall coverings, and window coverings, a carpet sample or other floor covering sample as shown at 80 in FIG. 6, preferably of standard sample size, is disposed directly upon the display floor base 24, said sample being bordered by the slits 26 and 50 formed in the base 24. Samples of wall coverings as shown at 82 and 84 in phantom in FIG. 3, such as wallpaper, and the like, are cut to a size having a length substantially the length of the horizontal rods 44 and 46 and a width slightly greater than the distance between the horizontal rods 44 and 46 and the display floor base 24. The wall covering samples are preferably formed with loop portions at the upper ends thereof such that said loop portions can be slipped onto the horizontal rods 44 and 46. Lower edge portions of the wall covering samples are inserted into the slits 26 and 50, respectively, so that the wall covering samples can hang straight from the rods 44 and 46, the fitting of lower edge portions of the wall covering samples into the slits 26 and 50 lending stability thereto. Although not shown, the wall covering samples can further have vertical structural members attached to spaced side portions thereof on the rear surface thereof in order to cause said samples to hang vertically. The wall covering samples thus disposed from the horizontal rods 44 and 46 essentially appear to comprise perpendicular adjacent walls of a room, the floor covering sample disposed on the display floor base 24 further simulating the decorative effect of the samples within the simulation area 22. The window simulation housing 34, when disposed in the extended configuration, allows a sample of a window covering, such as a drapery material, or the like, to be disposed over said housing 34 or on the horizontal rod 62, the decorative effect within the simulation area 22 thus being observeable as if the simulation area 22 comprised a room having three walls, the observer standing in the plane of the fourth wall of the room. Through use of the ceiling simulation housing 38 supplementary to the window simulation housing 34, differing lighting conditions can be simulated within the simulation area 22 as aforesaid. It is, therefore, to be seen that the decoration effects of differing combinations of floor, wall, and window coverings can be simulated within the simulation area 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for simulating the effects of decorative materials in a room-like setting, particularly floor and wall coverings, comprising:
    a base member;
    first and second horizontal rods disposed in surmounting relation to the base member in substantially parallel relation to the plane of the base member, the rods being substantially perpendicular to each other; and,
    means carried by the base member for mounting the rods, decorative materials being suspended from the rods to simulate decoratively covered walls adjacent the base member, a decorative floor covering material being disposed on the base member to simulate a decoratively covered floor, the simulation thereby provided illustrating the effects of a room decorated with the decorative materials carried by said rods and said base member.

2. The apparatus of claim 1 wherein the base member has slits disposed therein beneath each of the rods, the longitudinal axes of the slits being respectively parallel to the rods surmounting each said slit, the slits receiving lower edge portions of the decorative materials suspended respectively from the rods.

3. The apparatus of claim 1 and further comprising:
    storage housing mounted adjacent to the base member; and,
    means for simulating the effect of a window at a location adjacent the base member, said means being movable relative to the base member into and from a stored location in the storage housing.

4. The apparatus of claim 3 wherein the window simulation means comprise:
    a window simulation housing;
    a window element mounted in the window simulation housing, the plane of the window element being perpendicular to the plane of the base member;
    a third horizontal rod mounted in the window simulation housing, the rod being parallel to the plane of the window element and to the lane of the base member, the rod further being spaced vertically from the base member, the rod being disposed on the side of the window element adjacent to the base member; and,
    lighting means mounted in the window simulation housing on the side of the window element opposite the base member for illuminating the space defined by the base member and the vertical planes through said rods perpendicular to the base member to simulate the effects of natural day lighting in said spaced.

5. The apparatus of claim 4 and further comprising:
    at least one track follower mounted on the window simulation housing;
    at least one track rail mounted on the storage housing and extending in a direction parallel to an edge portion of the base member, the track follower being received within the track rail for movement therein, the window simulation housing being movable relative to the storage housing and the base member on the track rail.

6. The apparatus of claim 5 wherein the base member has a recess formed in the edge portion thereof along which the window simulation housing extends, lower portions of the window simulation housing being received within the recess for movement therein.

7. The apparatus of claim 3 and further comprising means for simulating the effect of a ceiling at a location surmounting and spaced vertically from the base member, said means being movable relative to the base member into and from a stored location in the storage housing.

8. The apparatus of claim 7 wherein the ceiling simulation means comprise:
    a ceiling simulation housing; and,
    a lighting means mounted in the ceiling simulation housing for illuminating the space defined by the base member and the vertical planes through said rods perpendicular to the base member to simulate the effects of artificial lighting in said space.

9. The apparatus of claim 8 and further comprising:
    at least one track follower mounted on the ceiling housing;
    at least one track rail mounted on the storage housing, the track follower being received within the track rail for movement therein, the ceiling simulation housing being movable relative to the storage housing and the base member on the track rail.

10. The apparatus of claim 4 wherein the lighting means comprises a fluorescent light source.

* * * * *